(12) United States Patent
Conta et al.

(10) Patent No.: US 8,797,770 B2
(45) Date of Patent: Aug. 5, 2014

(54) SYSTEM AND METHOD FOR CAPACITIVE DC-DC CONVERTER WITH VARIABLE INPUT AND OUTPUT VOLTAGES

(75) Inventors: Matteo Conta, Irvine, CA (US); Lorenzo Crespi, Costa Mesa, CA (US)

(73) Assignee: Conexant Systems, Inc., Irvine, CA (US)

( * ) Notice: Subject to any disclaimer, the term of this patent is extended or adjusted under 35 U.S.C. 154(b) by 139 days.

(21) Appl. No.: 13/312,879

(22) Filed: Dec. 6, 2011

(65) Prior Publication Data
US 2013/0141071 A1 Jun. 6, 2013

(51) Int. Cl.
*H02M 3/18* (2006.01)
(52) U.S. Cl.
USPC .............................................. 363/59; 307/110
(58) Field of Classification Search
USPC ................. 363/59, 60, 62; 307/109, 110, 115
See application file for complete search history.

(56) References Cited

U.S. PATENT DOCUMENTS

| | | | |
|---|---|---|---|
| 6,055,168 A | 4/2000 | Kotowski et al. | |
| 6,169,673 B1 * | 1/2001 | McIntyre et al. | ............... 363/59 |
| 6,693,808 B2 * | 2/2004 | Myono | ........................... 363/62 |
| 6,753,623 B2 * | 6/2004 | McIntyre et al. | ............. 307/109 |
| 2011/0133963 A1 * | 6/2011 | Kawai | ............................ 341/110 |

OTHER PUBLICATIONS

Bayer, Erich, et al.; "Charge Pump with Active Cycle Regulation—Closing the Gap between Linear—and Skip Modes," 0-7803-5692-6 (c) 2000 IEEE; pp. 1497-1502.
Ma, Mengzhe; "Design of High Efficiency Step-Down Switched Capacitor DC/DC Converter," A Thesis Submitted to Oregon State University; Presented May 21, 2003.

* cited by examiner

*Primary Examiner* — Adolf Berhane
*Assistant Examiner* — Emily P Pham
(74) *Attorney, Agent, or Firm* — Jackson Walker L.L.P.; Christopher J. Rourk

(57) ABSTRACT

A capacitive voltage converter comprising a switched capacitor array having a voltage input and a voltage output. A skip gating control coupled to the switched capacitor array and configured to control a switching activity of the switched capacitor array. A resistance look-up table coupled to the switched capacitor array and configured to control a resistance value of the switched capacitor array.

20 Claims, 4 Drawing Sheets

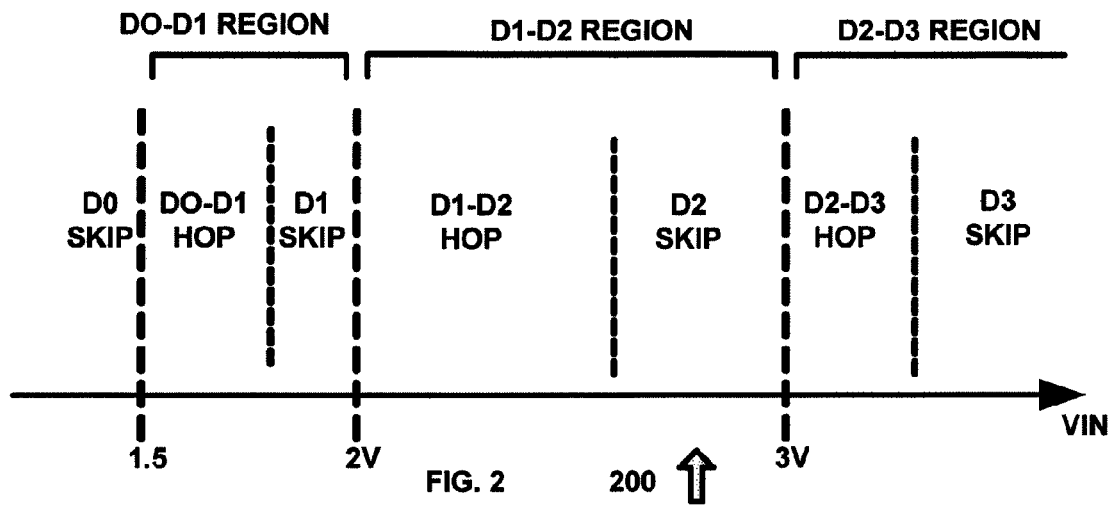
FIG. 2
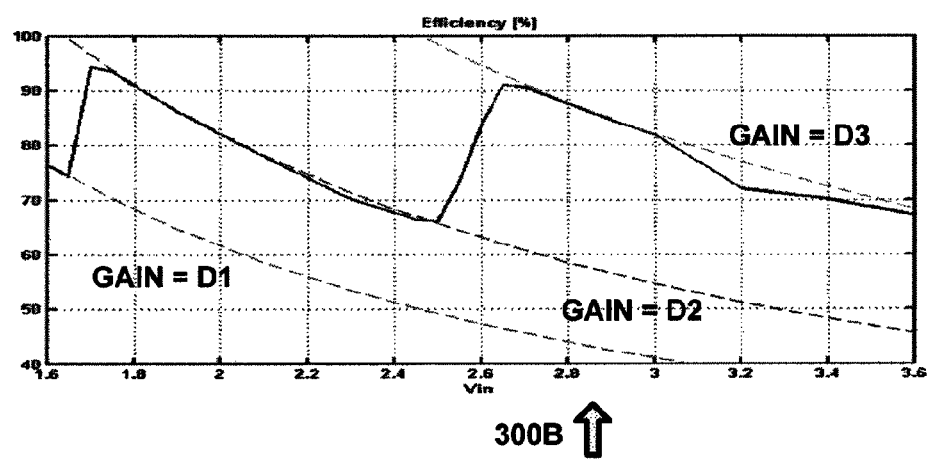
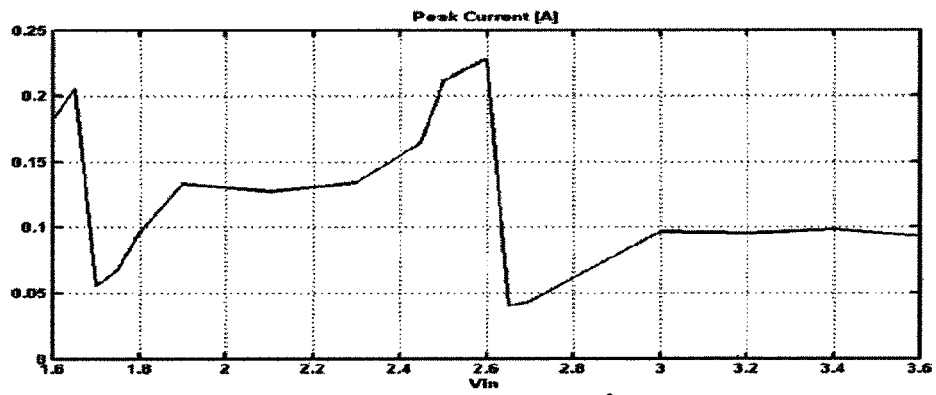
FIG. 3

FIG. 4    400

SYSTEM AND METHOD FOR CAPACITIVE DC-DC CONVERTER WITH VARIABLE INPUT AND OUTPUT VOLTAGES

TECHNICAL FIELD

The present disclosure relates to capacitive DC-DC converters, and more specifically to a system and method for a capacitive DC-DC converter that can utilize variable input voltages to generate output voltages with increased efficiency.

BACKGROUND OF THE INVENTION

Capacitive DC-DC voltage converters are known in the art. Although such voltage converters have known advantages for integrated circuit applications, they also have known disadvantages, such as limited capability to drive high current loads.

SUMMARY OF THE INVENTION

A capacitive voltage converter is disclosed that includes a switched capacitor array having a voltage input and a voltage output. A skip gating control is connected to the switched capacitor array and is configured to control the switching activity of the switched capacitor array, such as by setting one or more switches. A resistance look-up table is also connected to the switched capacitor array and is configured to control a resistance value of the switched capacitor array, such as by controlling a number of parallel switches that feed the capacitors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 2 is a diagram showing gain modes as a function of voltage in accordance with an exemplary embodiment of the present disclosure;

FIG. 3 is a diagram of a current response and of an efficiency response of a system in accordance with an exemplary embodiment of the present disclosure;

DETAILED DESCRIPTION OF THE INVENTION

Figure 1:
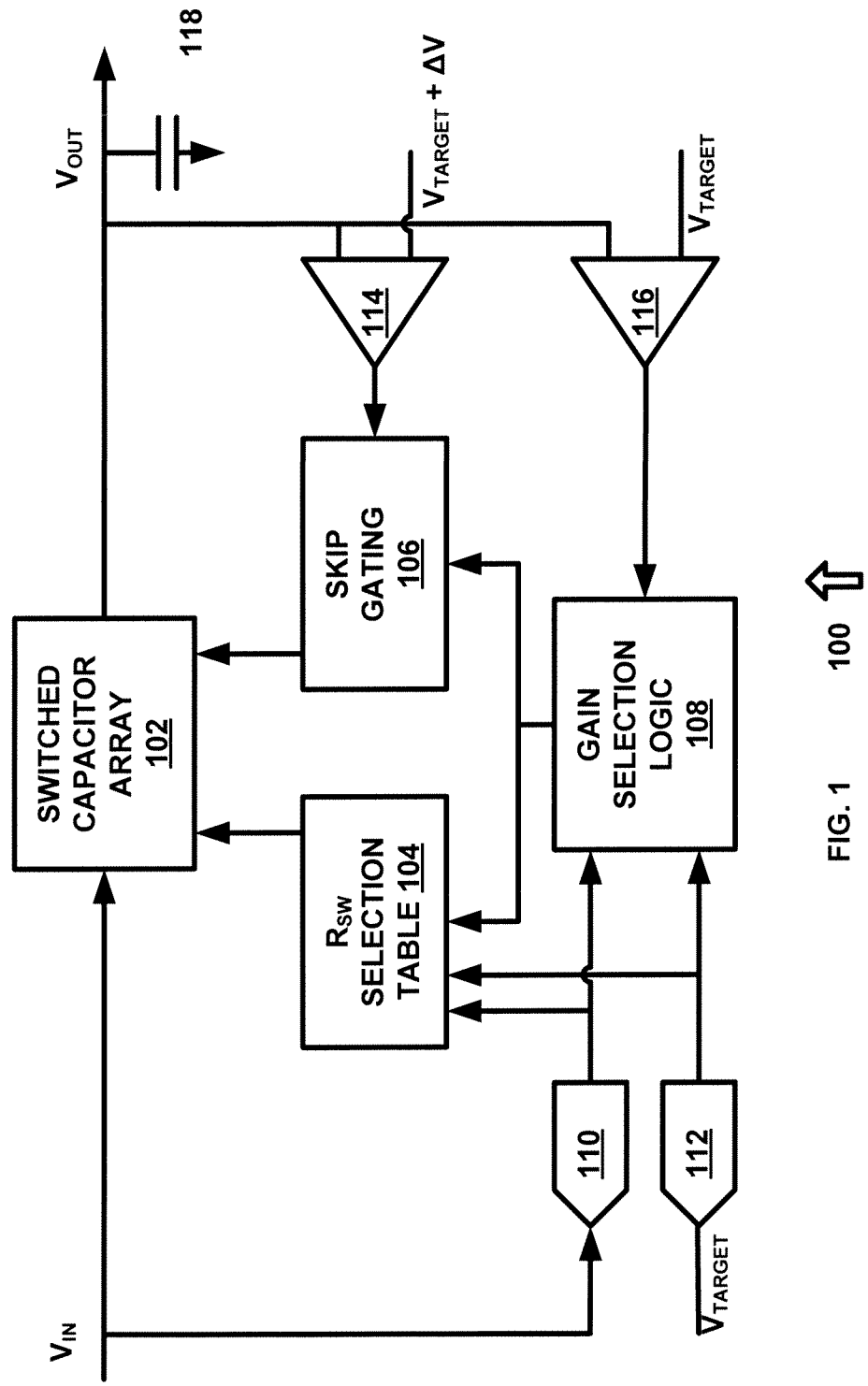
FIG. 1 is a diagram of a system for a capacitive dc-dc converter with variable input and output voltages in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

Capacitive DC-DC converters ("charge-pumps") are becoming increasingly common for generation of ASIC power supplies at low or moderate current levels. Because they require no external inductive components, they offer an inexpensive bill of materials, a small footprint, and limited electromagnetic interference concerns.

A control loop can be used for capacitive DC-DC converters to regulate the charge-pump output voltage. While "skip mode" regulation (which consists in stopping the charge-pump switching activity when the output voltage exceeds the target voltage) and "gain hopping" regulation (which dynamically adjusts charge-pump gain as a function of input voltage and loading conditions) are known, skip mode regulation without gain control is very inefficient if the input voltage varies over wide voltage ranges, and gain hopping involves significant power losses at the transitions between low and high gain and is only effective for certain combinations of input and output voltages.

Furthermore, because of their pulsed nature, capacitive DC-DC converters tend to generate large spikes on the input and output currents, which can be detrimental to other circuitry in the system by means of ground bounce noise and radiated emissions. While "linear mode" analog loops that continuously modulate the resistance of the charge-pumps switches as a function of the output current can be used to address this problem, it is not known how to combine skip mode (which is used for overall output voltage control and to achieve high-efficiency at light current loads) with gain hopping (which is used for high-efficiency over wide voltage ranges) and with linear mode (which is used for controlling current spikes).

Accordingly, a system and method for controlling a DC-DC converter that combines skip mode, gain hopping and switch resistance control is disclosed. A skip comparator stops switching activity in a capacitor array whenever the output voltage exceeds the target voltage plus a small overhead voltage $\Delta V$. In parallel, a hop comparator selects one of two gain modes for the switched cap array: a higher gain that is used when $V_{OUT}$ is less than $V_{TARGET}$, and a lower gain that is used when $V_{OUT}$ is greater than $V_{TARGET}$.

To support an input voltage that can vary over a wide range, more than two gain modes are utilized. In one exemplary embodiment, four gain modes are utilized, namely:

mode D0 with a gain=1
mode D1 with a gain=⅔
mode D2 with a gain=½
mode D3 with a gain=⅓

Gain selection logic which is based on the outputs of two analog to digital converters representing $V_{IN}$ and $V_{TARGET}$ is used to determine which of two gain modes are required. For example, if $V_{IN}$=3.3 V and $V_{TARGET}$=1.0V, the charge-pump can operate either in mode D2 (gain=½) or mode D3 (gain=⅓). The decision between D2 and D3 is a function of the hop signal, as discussed further herein.

The current flowing into the charge pump at any given time is proportional to $((G \times V_{IN}) - V_{OUT})/R_{SW}$, where G is the charge-pump gain and $R_{SW}$ is the resistance of the switched capacitor array. While $R_{SW}$ should be kept sufficiently low in order for the charge-pump to be able to deliver the largest required output current in the worst-case conditions for $V_{IN}/V_{OUT}$ (such as when $((G \times V_{IN})-V_{OUT})$ is small), under more favorable conditions (such as when $((G \times V_{1N})-V_{OUT})$ is large) a small value of $R_{SW}$ can cause unnecessarily high current peaks and does not improve the overall power efficiency.

In order to reduce current peaks, an "$R_{SW}$ selection table" is introduced. This table is used to compute $((G \times V_{IN})-V_{TARGET})$ by combining the A/D outputs and gain mode information (D0-D3) to select a higher value for the $R_{SW}$ parameter when possible. $R_{SW}$ can be modulated in discrete steps by splitting each switch of the capacitor array into an array of smaller switches, each providing a resistance multiple of $R_{SW}$.

Simulations show that the current peaks can be reduced significantly (such as by 3 to 4 times normal) by having eight discrete levels for $R_{SW}$, with minimal impact to the overall power efficiency. Based on these simulations, finer quantization for $R_{SW}$ does not appear to be necessary. The selection of the optimal value for $R_{SW}$ is made by way of a lookup table having $V_{IN}$, $V_{TARGET}$ and gain mode as inputs.

In most scenarios, switch resistance is not a constant but varies as a function of $V_{IN}$ in a non-linear manner. In one exemplary embodiment, the switches can be driven much more efficiently (lower resistance) at a higher voltage than at a lower voltage. The dependence of $R_{SW}$ on $V_{IN}$ can also be included in the lookup table without any further hardware requirements, as only the content of the lookup table needs to be updated. In this manner, the charge-pump can take full advantage of the lower resistance available at higher $V_{IN}$ when necessary, while properly scaling the switch resistance up when possible.

This architecture is quite simple and inexpensive in terms of hardware requirements. The skip gating block consists of one AND gate for each switch control signal. The gain selection logic is relatively simple digital combinational logic. The lookup table is quite small in size. For this design, each ADC is 3-bit resolution and the table stores 128×3-bit words. The analog to digital converter (ADC) used for $V_{IN}$ can be of low resolution, such as a 3-bit ADC, with minimal impact to the overall efficiency curve. A second ADC block connected to $V_{TARGET}$ is usually unnecessary as the $V_{TARGET}$ information is already available in digital format for any charge-pump with programmable output voltage.

The disclosed SHL mode uses two comparators instead of one in order to decouple the hop control from the skip control. Using one comparator, the charge pump gain is increased as soon as the skip duty ratio exceeds 80% so the charge pumps ends up working in a higher gain setting more frequently than is necessary, which causes a drop in efficiency. Using two comparators allows the charge-pump to stay in skip mode (at a lowest gain setting) even as the duty ratio approaches 100%. In addition, switch resistance control is added to the control loop. An analog feedback loop for switch resistance control is replaced with an open-loop discrete control, to eliminate analog components from the design (filter, variable-resistance switches), and to allow co-existence with gain-hopping.

FIG. 1 is a diagram of a system 100 for a capacitive dc-dc converter with variable input and output voltages in accordance with an exemplary embodiment of the present disclosure. System 100 can be implemented in hardware or a suitable combination of hardware and software, and can be one or more software systems operating on a hardware platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes switched capacitor array 102, which is a suitable combination of series and/or parallel connected switched capacitors that allows the values of the resistance and the topology of the switched-capacitor network to be controllably modified. In one exemplary embodiment, switched capacitor array 102 can be the combination of series and parallel connected switched capacitors shown in FIG. 4.5 of "Design of High Efficiency Step-Down Switched Capacitor DC/DC Converter," Mengzhe Ma, Oregon State University (May 21, 2003), which is hereby incorporated by reference, or other suitable switched capacitor arrays.

Switched capacitor array 102 receives input voltage $V_{IN}$ and outputs voltage $V_{OUT}$. By controlling the gain and resistance of switched capacitor array 102, the current consumed by switched capacitor array 102 and the efficiency of switched capacitor array 102 can be controlled, so as to minimize the current consumed and to maximize the efficiency. Controls for selecting switches that control the resistance and capacitor settings of switched capacitor array 102 are received from $R_{SW}$ selection table 104 and skip gating 106. As discussed above and further herein, $R_{SW}$ selection table 104 is used to select values of resistance for switched capacitor array 102, and skip gating 106 is used to control topology and switching activity for switched capacitor array 102

$R_{SW}$ selection table 104 receives inputs representing the target voltage $V_{TARGET}$ from analog to digital converter 112, the input voltage $V_{IN}$ from analog to digital converter 110 and the gain mode control signal from gain selection logic 108, and generates a resistor selection setting as a function of those inputs. An example of values for $R_{SW}$ selection table 104 is provided below. The values range from 1 ohm to 8 ohms, and higher resistance values are chosen when $V_{IN}$ is larger. This exemplary lookup table can be selected when the gain mode is D3, with similar tables being used for each of the other gain modes (such as D0, D1 and D2).

| TARGET | $V_{IN}$ | | | | | |
|---|---|---|---|---|---|---|
| (volts) | <2.8 | 2.8-3.0 | 3.0-3.2 | 3.2-3.4 | 3.4-3.6 | >3.6 |
| 0.7-0.8 | 1 Ω | 2 Ω | 4 Ω | 5 Ω | 6 Ω | 8 Ω |
| 0.8-0.9 | 1 Ω | 1 Ω | 2 Ω | 3 Ω | 5 Ω | 6 Ω |
| 0.9-1.0 | 1 Ω | 1 Ω | 1 Ω | 1 Ω | 3 Ω | 5 Ω |
| 1.0-1.1 | 1 Ω | 1 Ω | 1 Ω | 1 Ω | 1 Ω | 2 Ω |

Gain selection logic 108 receives an input representing target voltage $V_{TARGET}$ from analog to digital converter 112, an input representing input voltage $V_{IN}$ from analog to digital converter 110 and the output of comparator 116, which receives $V_{TARGET}$ and $V_{OUT}$ and which generates and output indicative of whether $V_{TARGET}$ is larger or smaller than $V_{OUT}$. Gain selection logic 108 outputs a control signal to $R_{SW}$ selection table 104 and skip gating 106 indicating which gain region the system should be operating in ($D_0$ through $D_3$).

Skip gating 106 receives the output from gain selection logic 108 and a signal from comparator 114, which compares $V_{OUT}$ and $V_{TARGET}$ plus a small overhead voltage $\Delta V$. Capacitor 118 is coupled to the output $V_{OUT}$ in order to reduce voltage ripple.

In operation, system 100 provides for the combination of a skip mode control for a DC-DC converter (which is used for overall output voltage control and to achieve high-efficiency at light current loads) with gain hopping mode of operation for a DC-DC converter (which is used for high-efficiency over wide voltage ranges) and with a linear mode of operation for a DC-DC converter (which is used for controlling current spikes). System 100 thus provides for improved efficiency and reduced current requirements.

FIG. 2 is a diagram 200 showing gain modes as a function of voltage in accordance with an exemplary embodiment of the present disclosure. Diagram 200 shows four exemplary gain modes that can be utilized to improve the efficiency of a DC-DC voltage converter, namely:

mode D0 with a gain=1
mode D1 with a gain=⅔
mode D2 with a gain=½
mode D3 with a gain=⅓

Gain selection logic 108 is used to determine which of two gain modes are required as a function of the inputs discussed above or other suitable inputs. For example, if $V_{IN}$=3.3 V and $V_{TARGET}$=1.0 V, the charge-pump can operate either in mode D2 (gain=½) or mode D3 (gain=⅓). The decision between D2 and D3 is a function of the hop signal. In the lower portion of a gain region, a hop mode of operation is selected, whereas in the higher portion of a gain region, a skip mode of operation is selected. The mode of operation is automatically selected depending on loading conditions: for example, if the charge-pump can provide the required output current using only gain mode D3, it will normally not use gain mode D2, thus achieving the highest possible power efficiency.

FIG. 3 is a diagram of a current response 300A and of an efficiency response 300B of a system such as system 100, in accordance with an exemplary embodiment of the present disclosure. Current response 300A increases in magnitude as the efficiency response follows a gain curve downward with increasing input voltage, then reduces in magnitude in the region between gain curves. By controlling the value of the switch resistance $R_{SW}$ of the switched capacitor bank, the current peak can be maintained at a level that is a factor of two or more less than the current peaks seen in prior art systems.

Figure 4:
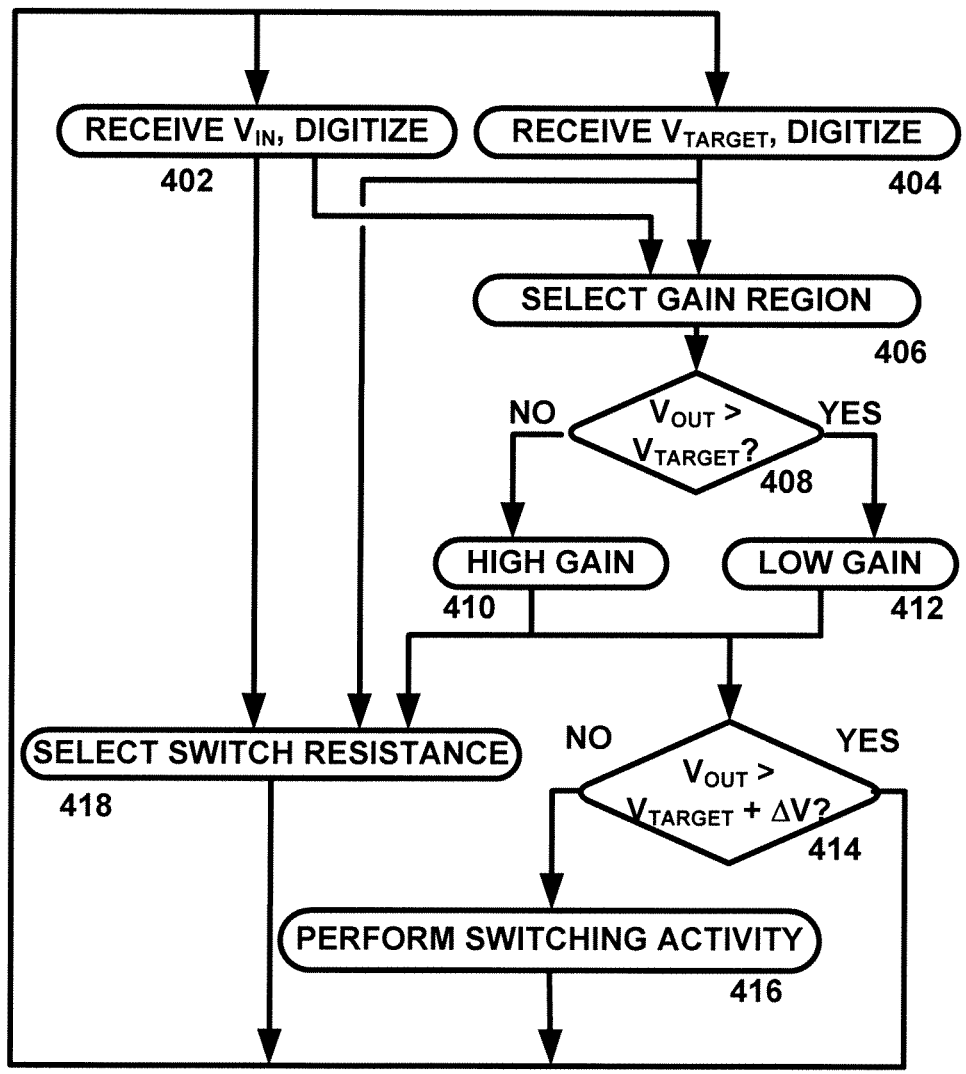
FIG. 4 is a flow chart of an algorithm for controlling a mode of operation of a DC-DC converter in accordance with an exemplary embodiment of the present disclosure.

FIG. 4 is a flow chart of an algorithm 400 for controlling a mode of operation of a DC-DC converter in accordance with an exemplary embodiment of the present disclosure. Algorithm 400 can be implemented in hardware or a suitable combination of hardware and software, and can be one or more software systems operating on a hardware platform.

Algorithm 400 begins at 402, where a value of $V_{IN}$ is received and digitized. In one exemplary embodiment, the analog value of $V_{IN}$ can be received at an analog to digital converter and can be converted into a binary value representing the analog voltage magnitude. The algorithm then proceeds to 406 and 418.

Likewise, at 404, an analog value of a target output voltage $V_{TARGET}$ is received and digitized. In one exemplary embodiment, the analog value of $V_{TARGET}$ can be received at an analog to digital converter and can be converted into a binary value representing the analog voltage magnitude. The algorithm then proceeds to 406 and 418.

At 406, a gain region is selected, such as based on the value of $V_{IN}$ or other suitable variables. The algorithm then proceeds to 408, the output voltage $V_{OUT}$ is compared to the target voltage $V_{TARGET}$, such as by providing the voltages as inputs to a comparator and generating an output. If the value of $V_{OUT}$ is larger than the target voltage $V_{TARGET}$, then the algorithm proceeds to 412, where a low gain mode is selected, otherwise, the algorithm proceeds to 410 where a high gain mode is selected. The algorithm then proceeds to 418, where a switch resistance is selected, and to 414, where it is determined whether $V_{OUT}$ is greater than $V_{TARGET}$ plus a small overhead voltage $\Delta V$. If $V_{OUT}$ is greater than $V_{TARGET}$ plus a small overhead voltage $\Delta V$, the algorithm returns to 402 and 404, otherwise, the algorithm proceeds to 416, where switching activity is performed.

In operation, algorithm 400 allows a capacitor array in a DC-DC converter to be controlled so as to improve efficiency, reduce current to the capacitor array, and for other suitable purposes.

Figure 5:
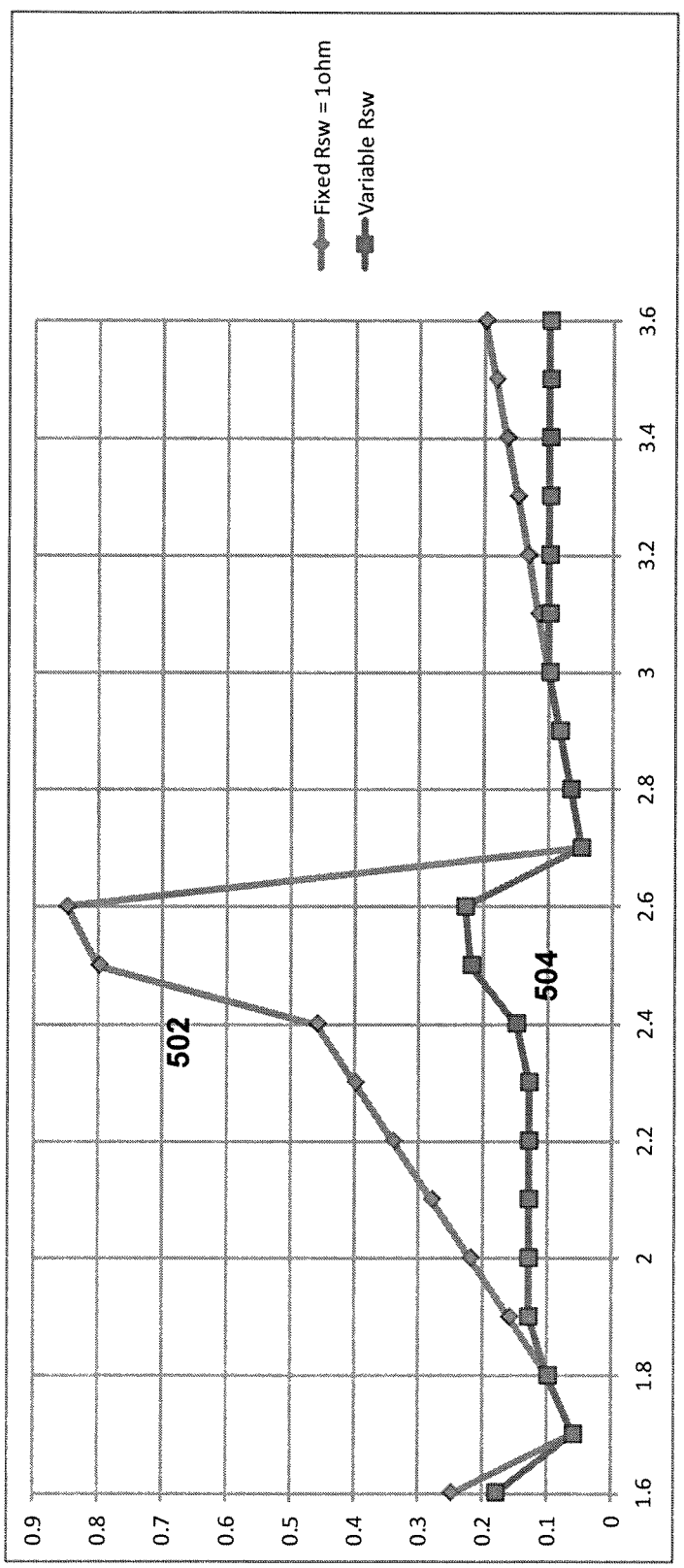
FIG. 5 is a diagram showing the effect of $R_{SW}$ on current in accordance with an exemplary embodiment of the present invention.

FIG. 5 is a diagram 500 showing the effect of $R_{SW}$ on current in accordance with an exemplary embodiment of the present invention. The top line (502) shows an example of the current drawn as a function of voltage when the switch resistance uniformly equals 1 ohm, and the bottom line (504) shows an example of the current for the same voltage profile when the switch resistance is allowed to vary as described herein. By reducing the current requirements for the capacitor array, the efficiency of the DC-DC converter is improved.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A capacitive voltage converter comprising:
a switched capacitor array having a voltage input and a voltage output;
a skip gating control coupled to the switched capacitor array and configured to control a switching activity of the switched capacitor array to stop switching activity when the output voltage exceeds a target voltage; and
a resistance look-up table coupled to the switched capacitor array and configured to control a resistance value of the switched capacitor array as a function of a target voltage value input, the voltage input and a gain value.

2. The capacitive voltage converter of claim 1 further comprising gain selection logic coupled to the skip gating control and the resistance look-up table and configured to provide a gain value to the skip gating control and the resistance look-up table.

3. The capacitive voltage converter of claim 2 wherein the skip gating control comprises an output voltage value input and is configured to control the capacitance value of the switched capacitor array as a function of the output voltage value input.

4. The capacitive voltage converter of claim 2 wherein the switched capacitor array is configured to operate in two or more gain regions.

5. The capacitive voltage converter of claim 2 wherein the gain selection logic comprises an output voltage value input and is configured to generate the gain as a function of the output voltage value input.

6. The capacitive voltage converter of claim 2 wherein the switched capacitor array is configured to provide two or more selectable resistance values for at least one switch in the switched capacitor array.

7. The capacitive voltage converter of claim 1 wherein the resistance look-up table comprises an input voltage value input and is configured to control the resistance value of the switched capacitor array as a function of the input voltage value input.

8. The capacitive voltage converter of claim 1 wherein the skip gating control comprises an output voltage value input and is configured to control the capacitance value of the switched capacitor array as a function of the output voltage value input.

9. The capacitive voltage converter of claim 1 wherein the switched capacitor array is configured to operate in two or more gain regions.

10. The capacitive voltage converter of claim 1 wherein the switched capacitor array is configured to provide two or more selectable resistance values for at least one switch in the switched capacitor array.

11. A method for controlling a capacitive voltage converter comprising:
  receiving an input voltage;
  selecting a gain region for a switched capacitor array as a function of the input voltage;
  selecting a skip gating control setting for the switched capacitor array as a function of the gain region; and
  selecting a resistance setting of the switched capacitor array as a function of the input voltage, a gain value for the switched capacitor array and a target voltage for an output of the switched capacitor array.

12. The method of claim 11 further comprising selecting the gain region for the switched capacitor array as a function of an output voltage of the switched capacitor array.

13. The method of claim 12 further comprising selecting the skip gating control setting for the switched capacitor array as a function of an output voltage of the switched capacitor array.

14. The method of claim 12 further comprising selecting the skip gating control setting for the switched capacitor array as a function of a target voltage for an output of the switched capacitor array.

15. The method of claim 11 further comprising selecting the skip gating control setting for the switched capacitor array as a function of a target voltage for an output of the switched capacitor array.

16. The method of claim 15 further comprising selecting the gain region for the switched capacitor array as a function of a target voltage for an output of the switched capacitor array.

17. The method of claim 11 further comprising selecting the skip gating control setting for the switched capacitor array as a function of an output voltage of the switched capacitor array.

18. The method of claim 17 further comprising selecting the gain region for the switched capacitor array as a function of a target voltage for an output of the switched capacitor array.

19. The method of claim 11 further comprising selecting the gain region for the switched capacitor array as a function of a target voltage for an output of the switched capacitor array.

20. A capacitive voltage converter comprising:
  a switched capacitor array having a voltage input and a voltage output, the switched capacitor array is configured to operate in two or more gain regions and to provide two or more selectable resistance values for at least one switch in the array;
  a skip gating control coupled to the switched capacitor array and configured to control a switching activity of the switched capacitor array, the skip gating control comprises an output voltage value input and is configured to control the switching activity of the switched capacitor array as a function of the output voltage value input;
  a resistance look-up table coupled to the switched capacitor array and configured to control a resistance value of the switched capacitor array, and wherein the resistance look-up table further comprises:
    a target voltage value input and is configured to control the resistance value of the switched capacitor array as a function of the target voltage value input;
    an input voltage value input and is configured to control the resistance value of the switched capacitor array as a function of the input voltage value input; and
    a target voltage value input and is configured to control the resistance value of the switched capacitor array as a function of a target voltage value input and the input voltage and a gain value;
  gain selection logic coupled to the skip gating control and the resistance look-up table and configured to provide the gain value to the skip gating control and the resistance look-up table, the gain selection logic comprises an output voltage value input and is configured to generate the gain value as a function of the output voltage value input.

* * * * *